US012574962B2

(12) United States Patent　　(10) Patent No.:　US 12,574,962 B2
Lin　　(45) Date of Patent:　Mar. 10, 2026

---

(54) USER EQUIPMENT AND RESOURCE MONITORING METHOD IN SIDELINK COMMUNICATION

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 347 days.

(21) Appl. No.: 18/351,750

(22) Filed: Jul. 13, 2023

(65) Prior Publication Data

US 2023/0371070 A1　　Nov. 16, 2023

Related U.S. Application Data

(63) Continuation of application No. PCT/CN2022/072059, filed on Jan. 14, 2022.
(Continued)

(51) Int. Cl.
*H04W 74/0808*　　(2024.01)
*H04W 72/02*　　(2009.01)
(Continued)

(52) U.S. Cl.
CPC ....... *H04W 74/0808* (2013.01); *H04W 72/02* (2013.01); *H04W 72/0446* (2013.01); *H04W 92/18* (2013.01)

(58) Field of Classification Search
CPC ............. H04W 74/0808; H04W 72/02; H04W 72/0446; H04W 92/18
See application file for complete search history.

(56) References Cited

U.S. PATENT DOCUMENTS

2022/0086803 A1*　3/2022　Li ..................... H04W 72/0453
2022/0377748 A1*　11/2022　He .......................... H04W 4/70
(Continued)

FOREIGN PATENT DOCUMENTS

CN　　110662202　　1/2020
EP　　3522630　　8/2019

OTHER PUBLICATIONS

Huawei et al., "Remaining details of sidelink resource allocation mode 2," 3GPP TSG RAN WG1 Meeting #103-e, R1-2007612, Oct. 2020.
(Continued)

*Primary Examiner* — Chae S Lee
(74) *Attorney, Agent, or Firm* — Hodgson Russ LLP

(57)　　ABSTRACT

A user equipment (UE) and a resource monitoring method in sidelink communication are provided. The resource monitoring method in sidelink communication by the UE includes receiving, by a physical layer of the UE, a request and/or a configuration from a higher layer of the UE, to determine a subset of resources of a sidelink resource pool as part of partial sensing based on a mode 2 resource allocation for sidelink transmission, determining a resource selection window and/or selecting a number of candidate slots in the sidelink resource pool according to a time bound, monitoring slots according to the number of candidate slots and a set of one or more reservation periods provided by the higher layer, and reporting, to the higher layer, a set of candidate single-slot resources after exclusion of resources.

14 Claims, 2 Drawing Sheets

Related U.S. Application Data

(60) Provisional application No. 63/137,965, filed on Jan. 15, 2021.

(51) Int. Cl.
    *H04W 72/0446*     (2023.01)
    *H04W 92/18*     (2009.01)

(56)           References Cited

U.S. PATENT DOCUMENTS

| | | | | |
|---|---|---|---|---|
| 2023/0156670 A1* | 5/2023 | Yoon | ................. | H04W 72/0446 |
| | | | | 370/329 |
| 2023/0276526 A1* | 8/2023 | Shin | ...................... | H04W 76/23 |
| | | | | 370/329 |
| 2024/0214940 A1* | 6/2024 | Zhang | ............... | H04W 52/0216 |

OTHER PUBLICATIONS

Oppo, "FL summary for AI 8.11.2.1—resource allocation for power saving," 3GPP TSG RAN WG1 #103-e, R1-2009584, Oct. 2020.
WIPO, International Search Report and Written Opinion for PCT/CN2022/072059, Mar. 29, 2022.
CMCC, "Discussion on resource allocation for power saving," 3GPP TSG RAN WG1 #103-e, R1-2008031, Oct. 2020.
EPO, Extended European Search Report for EP Application No. 22739128.1, Apr. 8, 2024.

* cited by examiner

30

410

412

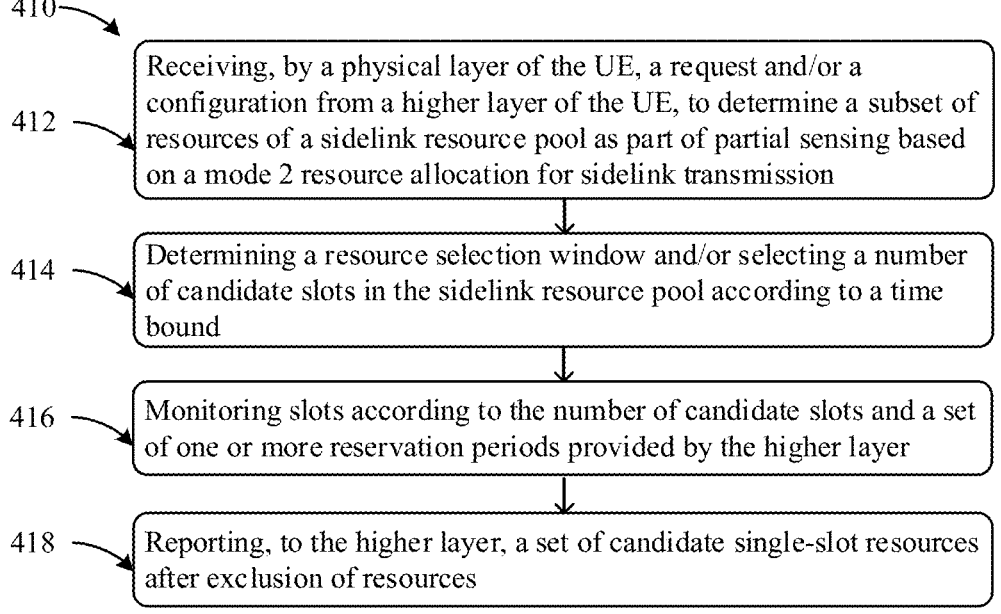

Receiving, by a physical layer of the UE, a request and/or a configuration from a higher layer of the UE, to determine a subset of resources of a sidelink resource pool as part of partial sensing based on a mode 2 resource allocation for sidelink transmission

414

Determining a resource selection window and/or selecting a number of candidate slots in the sidelink resource pool according to a time bound

416

Monitoring slots according to the number of candidate slots and a set of one or more reservation periods provided by the higher layer

418

Reporting, to the higher layer, a set of candidate single-slot resources after exclusion of resources

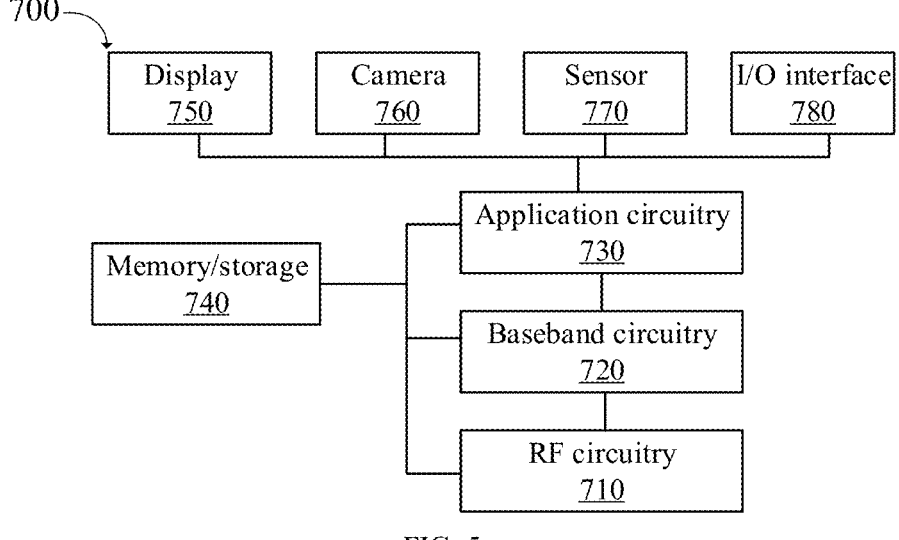

| Display 750 | Camera 760 | Sensor 770 | I/O interface 780 |

Memory/storage 740

Application circuitry 730

Baseband circuitry 720

RF circuitry 710

FIG. 5

USER EQUIPMENT AND RESOURCE MONITORING METHOD IN SIDELINK COMMUNICATION

This application is a continuation of International Application No. PCT/CN2022/072059, filed Jan. 14, 2022, which claims priority to U.S. Provisional Application No. 63/137,965, filed Jan. 15, 2021, both of which are incorporated herein by reference in their entireties.

BACKGROUND OF DISCLOSURE

1. Field of the Disclosure

The present disclosure relates to the field of communication systems, and more particularly, to a user equipment (UE) and a resource monitoring method in sidelink (SL) communication, which can provide a good communication performance and/or provide high reliability.

2. Description of the Related Art

For an existing sidelink (SL) communication technology defined by 3GPP in Release 16, in order for a UE to select physical sidelink shared channel (PSSCH) resources for its own transmissions and to avoid collision with others (i.e., avoiding selecting resources already reserved by other UEs), the UE performs sensing in every slot of a SL resource pool for a duration of time (i.e., within a sensing window in the past) to obtain resource reservation information in physical sidelink control channel (PSCCH) transmitted from other UEs and to measure their sidelink reference signal received power (RSRP) levels, except for slots in which the UE own transmissions occur. Further, the UE continues to perform sensing in every slot after the resource selection up until the selected transmission resource occasions for re-evaluation and pre-emption checking by the UE to ensure collision free transmission. This kind of rigorous reservation monitoring and usage checking of all SL resources is commonly referred as full sensing operation.

To achieve power saving for pedestrian UEs (P-UEs) with limited battery power supply, random resource selection scheme based on no sensing at all and SL resource selection based on partial sensing scheme were introduced for P2X communication in 4th generation (4G) long term evolution (LTE) version of SL technology. The common assumption of the same traffic pattern, however, can no longer hold true and it should not be used as the basis for designing a new power saving based resource allocation scheme for 5th generation (5G) new radio (NR) SL communication. Since the use of NR-SL technology targets to support wider range of applications and services other than just P2X traffic as mentioned earlier, device UEs with limited power supply may be used for public safety voice communication, AR/VR gaming, and the device UEs may start to receive and decode SL data transmitted from others to be able to in communication with one another. As such, it becomes even more important to reduce/limit power consumption for the device UEs.

Therefore, there is a need for a user equipment (UE) and a sidelink resource exclusion method, which can solve issues in the prior art, reduce/limit power consumption, provide a good communication performance, and/or provide high reliability.

SUMMARY

An object of the present disclosure is to propose a user equipment (UE) and a resource monitoring method in sidelink communication, which can solve issues in the prior art, reduce/limit power consumption, provide a good communication performance, and/or provide high reliability.

In a first aspect of the present disclosure, a user equipment (UE) includes a memory, a transceiver, and a processor coupled to the memory and the transceiver. The processor is configured to receive, by a physical layer of the UE, a request and/or a configuration from a higher layer of the UE, to determine a subset of resources of a sidelink resource pool as part of partial sensing based on a mode 2 resource allocation for sidelink transmission. The processor is configured to determine a resource selection window and/or select a number of candidate slots in the sidelink resource pool according to a time bound. The processor is configured to monitor slots according to the number of candidate slots and a set of one or more reservation periods provided by the higher layer. The processor is configured to report, to the higher layer, a set of candidate single-slot resources after exclusion of resources.

In a second aspect of the present disclosure, a resource monitoring method in sidelink communication by a user equipment (UE) includes receiving, by a physical layer of the UE, a request and/or a configuration from a higher layer of the UE, to determine a subset of resources of a sidelink resource pool as part of partial sensing based on a mode 2 resource allocation for sidelink transmission, determining a resource selection window and/or selecting a number of candidate slots in the sidelink resource pool according to a time bound, monitoring slots according to the number of candidate slots and a set of one or more reservation periods provided by the higher layer, and reporting, to the higher layer, a set of candidate single-slot resources after exclusion of resources.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 4 is a flowchart illustrating a resource monitoring method in sidelink communication by a user equipment (UE) according to an embodiment of the present disclosure.

FIG. 5 is a block diagram of a system for wireless communication according to an embodiment of the present disclosure.

DETAILED DESCRIPTION OF EMBODIMENTS

Figure 1:
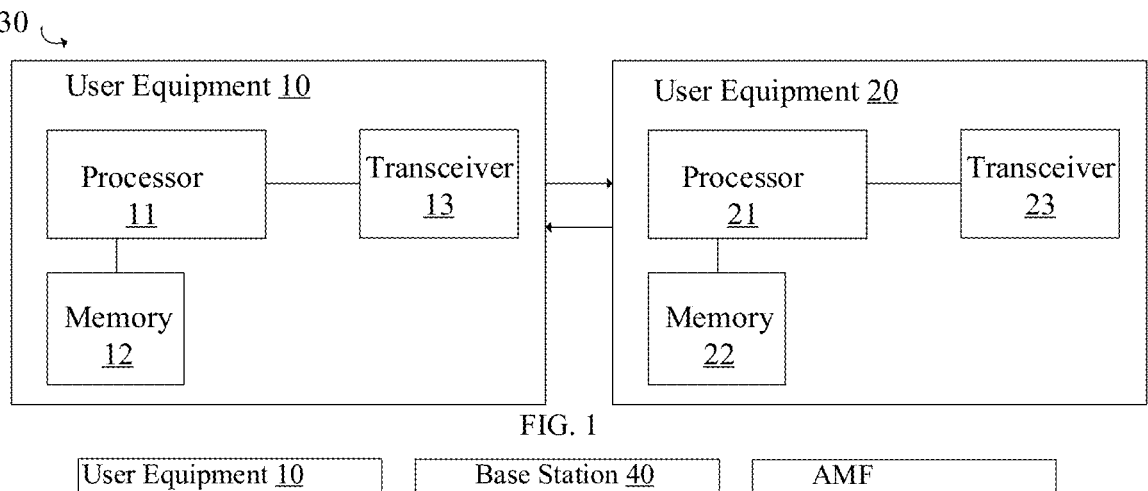
FIG. 1 is a block diagram of user equipments (UEs) of communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For the development of direct device-to-device (D2D) wireless technology standards in 3rd generation partnership project (3GPP), such as sidelink communication, the main focus and priority has so far been placed on vehicle-to-everything (V2X) communication related road safety use cases, where communicating devices/user equipment (UE) installed on vehicles are assumed to have unlimited supply of power. Since the design and utilization of sidelink (SL) communication technology can be easily extended to cover wider range of applications and uses such as pedestrians/vulnerable road users (VRUs) transmissions in pedestrian-to-everything (P2X) communication, direct D2D communication among public safety workers and extended reality (XR) gaming data exchange with nearby players, consumption of UE battery power due to SL radio reception and transmission would become one of the critical factors determining the feasibility, user experience and success of such application/extension. Therefore, the power saving aspect of the existing SL communication technology should be enhanced for portable user terminals such as helmets for cyclists, pedestrian smartphones, augmented reality (AR)/virtual reality (VR) headset devices or glasses, and emergency personnel on-body/backpack communication units.

For an existing sidelink (SL) communication technology defined by 3GPP in Release 16, in order for a UE to select physical sidelink shared channel (PSSCH) resources for its own transmissions and to avoid collision with others (i.e., avoiding selecting resources already reserved by other UEs), the UE performs sensing in every slot of a SL resource pool for a duration of time (i.e., within a sensing window in the past) to obtain resource reservation information in physical sidelink control channel (PSCCH) transmitted from other UEs and to measure their sidelink reference signal received power (RSRP) levels, except for slots in which the UE own transmissions occur. Further, the UE continues to perform sensing in every slot after the resource selection up until the selected transmission resource occasions for re-evaluation and pre-emption checking by the UE to ensure collision free transmission. This kind of rigorous reservation monitoring and usage checking of all SL resources is commonly referred as full sensing operation.

Beside sensing for the purpose of gaining knowledge of utilization and reservation status of SL resources, the UE decodes PSCCH and extracts sidelink control information (SCI) also for the purpose of decoding SL user data transmitted in PSSCH from other UEs. As such, for the V2X application, a Release 16 SL UE should always sense PSCCH transmissions and receive PSSCH from others in order to maintain road safety messages. Moreover, this full sensing operation is also very useful for selecting resources and transmitting SL data with aperiodic traffic pattern, since the timing of traffic generated from UE upper layers is unpredictable. Without the continuous sensing, the transmitter UE cannot guarantee the resource it selects has not been reserved by another UE. However, all these benefits of the full sensing operation come at a high cost of consuming a lot of UE processing power and drain device battery power quickly.

To achieve power saving for pedestrian UEs (P-UEs) with limited battery power supply, random resource selection scheme based on no sensing at all and SL resource selection based on partial sensing scheme were introduced for P2X communication in 4th generation (4G) long term evolution (LTE) version of SL technology. In the LTE-SL, it is always assumed the generation of P2X traffic is infrequent, periodic and predicable (i.e., one packet transport block (TB) per second), the required radio latency for transmitting P2X TB is fixed (i.e., 100 ms), and the target reliability/success rate is not very stringent (i.e., only 90%). Furthermore, it was also assumed that P-UE does not perform reception of PSSCH transmitted from other UEs (e.g., vehicle UEs). Instead, it relies on the vehicle UEs to receive SL information/warning messages transmitted by P-UEs in order to avoid accidents on the road and maintain road safety while minimizing the consumption of reception, processing and transmission power for P-UEs. Since the SL operation was kept very simple for P-UEs in LTE-V2X, the design for the partial sensing was also inflexible and cannot be adapted to variation in traffic patterns and transmission (Tx) parameters. That is, when P-UEs are configured to operate in UE autonomous resource allocation mode, the minimum number of subframes for resource selection, the step size ($P_{step}$) which determines the interval/frequency for the partial sensing and the time gap (k) between candidate resource subframes are all pre-configured or fixed, and the same set of values are applied for all P-UEs operating in the same resource pool. The main reason behind this "one size fits all" partial sensing operation design is due to the expected types of SL services and transmission patterns to be supported by power constrained P-UEs are very limited. As such, even if packet priority, latency requirement, TB size, and remaining device battery power are different among UEs operating in the same resource pool, all of the UEs will apply the same set of partial sensing parameters and values.

This common assumption of the same traffic pattern, however, can no longer hold true and it should not be used as the basis for designing a new power saving based resource allocation scheme for the 5th generation (5G) new radio (NR) SL communication. Since the use of NR-SL technology targets to support wider range of applications and services other than just P2X traffic as mentioned earlier, device UEs with limited power supply may be used for public safety voice communication, AR/VR gaming, and they will start having to receive and decode SL data transmitted from others to be able to in communication with one another. As such, it becomes even more important to reduce/limit power consumption for these device UEs.

For the present proposed method of sidelink radio resource selection, some embodiments aim to enhance flexibility and introduce adaptability of sidelink resource selection while limiting the processing power required for the partial sensing-based resource allocation scheme by setting a time bound for the resource selection window in order to minimize the amount of resource sensing and monitoring operation subsequently. By doing so, NR-SL communication with partial sensing will not only be able to flexibly support wider range of direct device-to-device (D2D) applications and services with different traffic characteristics, it can be also used to adapt to UE remaining battery level to conserve more power if required. Other benefits of adopting the newly proposed resource selection method for 5G-NR sidelink communication include: flexible adaptation and integration with SL discontinuous reception (DRX) operation and/or better protection to high priority SL transmissions according to latency requirement.

FIG. 1 illustrates that, in some embodiments, one or more user equipments (UEs) 10 (such as a first UE) and one or more user equipments (UEs) 20 (such as a second UE) of communication in a communication network system 30 according to an embodiment of the present disclosure are provided. The communication network system 30 includes one or more UEs 10 and one or more UE 20. The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21 and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V21/N) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond, for example providing cellular—vehicle to everything (C-V2X) communication.

In some embodiments, the UE 10 may be a sidelink packet transport block (TB) transmission UE (Tx-UE). The UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

Figure 2:
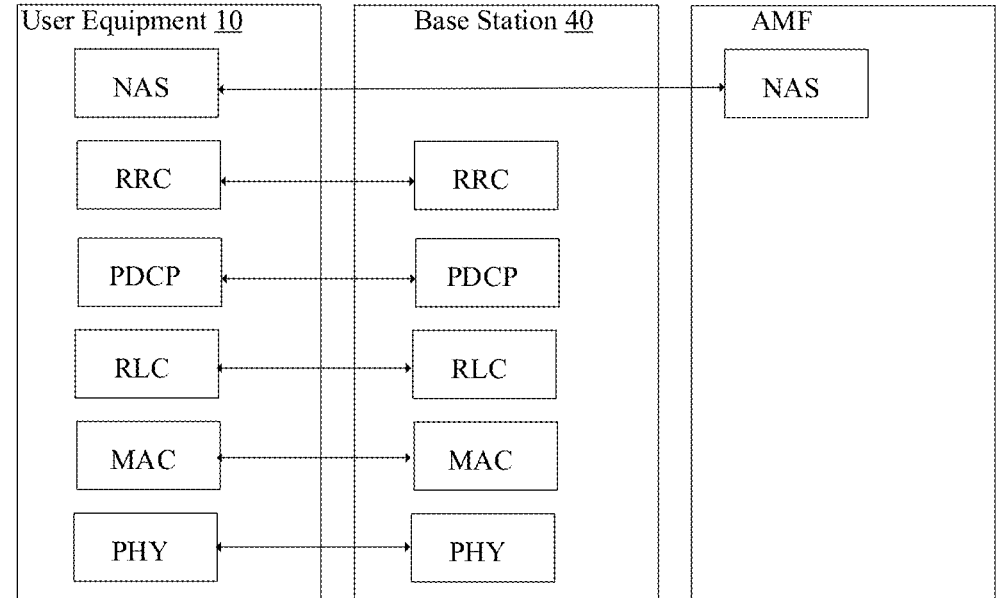
FIG. 2 is a schematic diagram illustrating an example user plane protocol stack according to an embodiment of the present disclosure.

FIG. 2 illustrates an example user plane protocol stack according to an embodiment of the present disclosure. FIG.

2 illustrates that, in some embodiments, in the user plane protocol stack, where service data adaptation protocol (SDAP), packet data convergence protocol (PDCP), radio link control (RLC), and media access control (MAC) sublayers and physical (PHY) layer may be terminated in a UE 10 and a base station 40 (such as gNB) on a network side. In an example, a PHY layer provides transport services to higher layers (e.g., MAC, RRC, etc.). In an example, services and functions of a MAC sublayer may comprise mapping between logical channels and transport channels, multiplexing/demultiplexing of MAC service data units (SDUs) belonging to one or different logical channels into/from transport blocks (TBs) delivered to/from the PHY layer, scheduling information reporting, error correction through hybrid automatic repeat request (HARQ) (e.g. one HARQ entity per carrier in case of carrier aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or transmission time interval (TTI) durations. In an example, automatic repeat request (ARQ) may operate on any of the numerologies and/or TTI durations the logical channel is configured with. In an example, services and functions of the PDCP layer for the user plane may comprise sequence numbering, header compression, and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping quality of service Indicator (QFI) in downlink (DL) and uplink (UL) packets. In an example, a protocol entity of SDAP may be configured for an individual PDU session.

Figure 3:
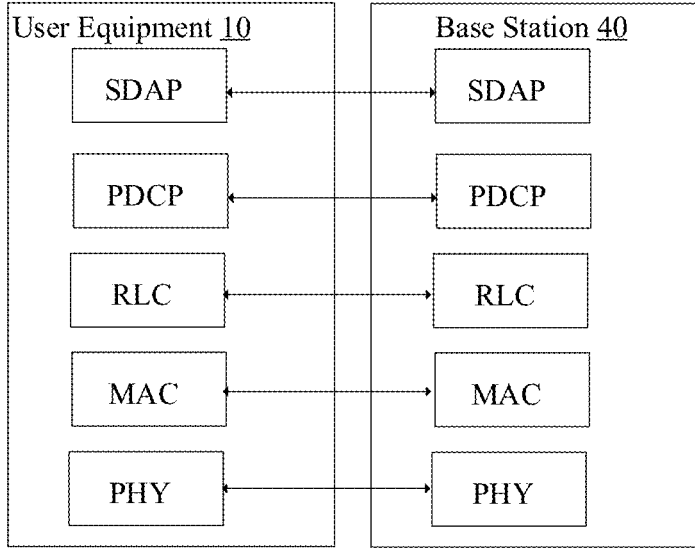
FIG. 3 is a schematic diagram illustrating an example control plane protocol stack according to an embodiment of the present disclosure.

FIG. 3 illustrates an example control plane protocol stack according to an embodiment of the present disclosure. FIG. 2 illustrates that, in some embodiments, in the control plane protocol stack where PDCP, RLC, and MAC sublayers and PHY layer may be terminated in a UE 10 and a base station 40 (such as gNB) on a network side and perform service and functions described above. In an example, RRC used to control a radio resource between the UE and a base station (such as a gNB). In an example, RRC may be terminated in a UE and the gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of signaling radio bearers (SRBs) and data radio bearers (DRBs), mobility functions, QoS management functions, UE measurement reporting and control of the reporting, detection of and recovery from radio link failure, and/or non-access stratum (NAS) message transfer to/from NAS from/to a UE. In an example, NAS control protocol may be terminated in the UE and AMF on a network side and may perform functions such as authentication, mobility management between a UE and an AMF for 3GPP access and non-3GPP access, and session management between a UE and a SMF for 3GPP access and non-3GPP access.

When a specific application is executed and a data communication service is required by the specific application in the UE, an application layer taking charge of executing the specific application provides the application-related information, that is, the application group/category/priority information/ID to the NAS layer. In this case, the application-related information may be pre-configured/defined in the UE. (Alternatively, the application-related information is received from the network to be provided from the AS (RRC) layer to the application layer, and when the application layer starts the data communication service, the application layer requests the information provision to the AS (RRC) layer to receive the information.)

In some embodiments, the processor 11 is configured to receive, by a physical layer of the UE 10, a request and/or a configuration from a higher layer of the UE 10, to determine a subset of resources of a sidelink resource pool as part of partial sensing based on a mode 2 resource allocation for sidelink transmission. The processor 11 is configured to determine a resource selection window and/or select a number of candidate slots in the sidelink resource pool according to a time bound. The processor 11 is configured to monitor slots according to the number of candidate slots and a set of one or more reservation periods provided by the higher layer. The processor 11 is configured to report, to the higher layer, a set of candidate single-slot resources after exclusion of resources. This can solve issues in the prior art, reduce/limit power consumption, provide a good communication performance, and/or provide high reliability.

FIG. 4 illustrates a resource monitoring method 410 in sidelink communication by a user equipment (UE) according to an embodiment of the present disclosure. In some embodiments, the method 410 includes: a block 412, receiving, by a physical layer of the UE, a request and/or a configuration from a higher layer of the UE, to determine a subset of resources of a sidelink resource pool as part of partial sensing based on a mode 2 resource allocation for sidelink transmission, a block 414, determining a resource selection window and/or selecting a number of candidate slots in the sidelink resource pool according to a time bound, a block 416, monitoring slots according to the number of candidate slots and a set of one or more reservation periods provided by the higher layer, and a block 418, reporting, to the higher layer, a set of candidate single-slot resources after exclusion of resources. This can solve issues in the prior art, reduce/limit power consumption, provide a good communication performance, and/or provide high reliability.

In some embodiments, when the mode 2 resource allocation is triggered in a slot n to determine the subset of resources for the sidelink transmission, one or more of following parameters are provided by the higher layer, and the one or more of following parameters comprises a maximum, minimum, or restricted number of candidate slots; a first layer (L1) priority for a corresponding sidelink data transport block (TB) to be transmitted; a remaining packet delay budget (PDB); a sidelink resource pool identifier and/or index; a set of one or more possible reservation period allowed for the sidelink resource pool; or a sidelink discontinuous reception (DRX) active/inactive period and/or timer. In some embodiments, the one or more of following parameters are radio resource control (RRC) configured by a base station or pre-configured. In some embodiments, the time bound is provided as $T_{2max}$, or $T_{2min}$ for the resource selection window, or the maximum, minimum, or restricted number of candidate slots from the higher layer, where $T_{2max}$ is a maximum length for the resource selection window with respect to a priority of a sidelink TB, and $T_{2min}$ is a minimum length for the resource selection window with respect to the priority of the sidelink TB. In some embodiments, $T_{2max}$, or $T_{2min}$ for the resource selection window, or the maximum, minimum, or restricted number of candidate slots is set based on a transmission priority of the TB ($Prio_{Tx}$) which has a total of 8 priority levels in L1, and each priority level has a corresponding value for $T_{2max}$, or $T_{2min}$ for the resource selection window, or the maximum, minimum, or restricted number of candidate slots.

In some embodiments, the resource selection window is defined as a time interval. In some embodiments, the number of candidate slots is greater than or equal to the minimum or restricted number of candidate slots. In some embodiments, the candidate slots are selected based on the sidelink DRX active/inactive period and/or timer. In some embodiments, the time interval is between $n+T_1$ and $n+T_2$ in the sidelink resource pool, the UE selects $T_2$ subject to $T_{2min} \leq T_2 \leq$ the remaining PDB, if $T_{2min}$ is smaller than the remaining PDB; otherwise $T_2$ is set to the remaining PDB. In some embodiments, the time interval is between $n+T_1$ and $n+T_2$ in the sidelink resource pool, the UE selects $T_1$ subject to $0 \leq T_1 \leq T_{processing}$, where $T_{processing}$ is an amount of UE processing time allowed to perform the mode 2 resource allocation and encode a physical sidelink control channel (PSCCH) and/or physical sidelink shared channel transmission (PSSCH) for transmission.

In some embodiments, monitoring slots in the sidelink resource pool is restricted to a subset of slots within a configured sensing window. In some embodiments, a candidate single-slot resource is excluded from an initialized set of candidate single-slot resources when the candidate single-slot resource overlaps with a resource indicated in a received sidelink control information (SCI) format 1-A and a measured reference signal received power (RSRP) of the sidelink transmission corresponding to the received SCI format 1-A is higher than a corresponding RSRP threshold.

In some embodiments, in the present disclosure of an inventive resource selection method intended for use by a 5th generation—new radio (5G-NR) sidelink (SL) communication system to minimize the amount of SL resource sensing and monitoring operation performing by a device with limited supply of battery power (e.g., smartphone, wearable device, augmented reality (AR)/virtual reality (VR) glasses and etc.) while not limiting the applicability of the user equipment (UE) autonomous resource allocation scheme in NR-SL to wide range of data traffics, these goals are achieved by applying a time bound (such as an upper time bound, a lower time bound, or a limited time bound) to a resource selection window (RSW) or a set of candidate slots for selection in a resource allocation mode 2 procedure.

As mentioned previously, long term evolution (LTE) SL version of partial sensing design for selecting resources was based on one main assumption that the traffic pattern from all pedestrian UEs (PUEs) is the same (i.e., one packet transport block (TB) in every one second and transmission latency is 100 ms), and every packet TB is only transmitted twice (i.e., one initial and one retransmissions). Therefore, the resource selection window does not need to be wide in order to select resources for the two SL transmissions. One advantage of this was that it can help to reduce the amount of partial sensing needed to select resources. However (on the other hand), if the resource selection window is too narrow/small, it may have the risk of not be able to find sufficient number of empty/unoccupied resources to perform resource selection from when resource pool usage is congested, and thus resulting in higher transmission collision probability with other UEs. Therefore, a minimum number of subframes for resource selection was applied in the LTE-SL partial sensing design. But the exact upper bound was not capped, because it was naturally limited by the maximum number of subframes that can be separated between the initial and the re-transmission (i.e., a limitation imposed by the sidelink control information (SCI) design in LTE-SL). In NR-SL, the total number of (re)transmission of a TB could be up to 32 times. If the RSW is not capped, the whole sensing duration could be very long.

In the existing 5G-NR sidelink communication system, a UE all the time performs "full sensing", monitoring every slot by decoding physical sidelink control channel (PSCCH) transmitted from other UEs and measuring RSRP for the received PSCCH/physical sidelink shared channel (PSSCH), in order to be in communication with other UEs and select appropriate/unreserved resources for its own SL transmissions. As such, a full sensing UE may trigger resource selection or re-selection multiple times within a packet delay budget (PDB) for transmission of a SL data transport block (TB) to avoid overbooking of SL resources. Although this resource selection strategy is well suited for transmission of a TB with SL hybrid automatic repeat request (HARQ) feedback in full sensing operation, because the UE has a full utilization and reservation status knowledge of SL resources all the time, but this will not work for a resource allocation scheme based on partial sensing for the following reason. From triggering SL resource (re)selection multiple times for a TB, it will create multiple resource selection windows (time shifted) and thus requiring the UE to perform multiple instances of partial sensing. Since the UE cannot predict at which point of resource selection/retransmission of a TB will be erroneously decoded by a receiver UE, therefore, it is not possible for the UE to determine all the required partial sensing slots in advance without over-sensing.

Hence from a power saving UE's perspective (i.e., UE perform partial sensing), it is more power efficient to perform resource selection only once and cover a longer duration. That is, according to a time limit so that the UE does not perform sensing/consume processing power than unnecessarily. In order to implement the proposed resource selection method of setting an upper limit to the resource selection timeframe/opportunity, the method comprises of the following procedure for a SL transmitting UE. Note that, the method does not need to carried out/performed in the same sequence order as described below.

In some embodiments, a UE physical layer receives a request or a configuration from a UE higher layer to report a subset of resources of a sidelink resource pool as part of partial sensing-based UE autonomous resource allocation (i.e., in sidelink mode 2) for PSCCH/PSSCH transmission. When the resource allocation procedure is triggered in slot n, one or more of the following parameters are provided by UE higher layer. Some of the following parameters may be directly configured by a network serving node/base station via radio resource control (RRC), the following parameters include: a time bound for resource selection window (such as $T_{2max}$ or $T_2$ min), a maximum/minimum (restricted) number of candidate slots, L1 priority for the corresponding SL data TB to be transmitted, a remaining packet delay budget (PDB), a sidelink resource pool identifier or index, a set of one or more possible reservation period allowed for the indicated SL resource pool, and/or a SL discontinuous reception (DRX) ON/OFF period (active/inactive timer).

In some embodiments, the UE determines a resource selection window (RSW) and/or a number of candidate slots (Y) according to a time bound ((such as an upper time bound, a lower time bound, or a limited time bound)) (e.g., in slots or ms). In some examples, the time bound is the provided as $T_{2max}$ or $T_{2min}$ or max/min (restricted) number of candidate slots from the UE higher layer. In an example, RRC configuration and/or UE determination of $T_{2max}$ and the max/min number of candidate slots may be based on at least one of the followings: transmission priority of the TB ($Prio_{Tx}$)—total of 8 priority levels in L1 and each priority level has a corresponding $T_{2max}$ or $T_{2min}$ or max/min number of candidate slots, portion of the remaining PDB (e.g., 20%, 30%, 50%, 80%), number of SL resources to be selected, power saving/consumption level or state, or a UE remaining battery level, a constant/fixed value (e.g. 16, 20, 32, 64, 100 slots).

In some embodiments, the RSW is defined as a time interval between $n+T_1$ and $n+T_2$. In an alternative, if $T_{2max}$ is shorter than the remaining PDB, then the UE selects $T_2$ subject to at least $T_2$ is smaller than or equal to $T_{2max}$ ($T_2 \leq T_{2max}$); otherwise $T_2$ is set to the remaining PDB or the UE selects $T_2$ subject to at least $T_2$ is smaller than or equal to the remaining PDB ($T_2 \leq$ remaining PDB). Further, the UE selects $T_1$ subject to $0 \leq T_1 \leq T_{processing}$, where $T_{processing}$ is an amount of UE processing time allowed to perform UE autonomous resource allocation in mode 2 and encode PSCCH/PSSCH for transmission.

In some embodiments, the RSW is defined as a time interval between $n+T_1$ and $n+T_2$. In an alternative, Y can be at least smaller/greater than or equal to the provided maximum/minimum (restricted) number of candidate slots. Y number of candidate slots may not include slots in which the UE has other planned SL or UL transmissions. The selection of Y candidate slots (exact location) should take into consideration of SL-DRX ON/OFF (active/inactive) period, if provided, as this will impact on the time duration for which the UE needs perform SL reception. Based on these, this implies that Y number of candidate slots can be allocated anywhere within the RSW (e.g., at the beginning, middle and/or the end) and the slots need not to be selected in a contiguous/consecutive manner. The UE selects $T_2$ subject to $T_{2min} \leq T_2 \leq$ remaining PDB, if $T_{2min}$ is smaller than the remaining PDB; otherwise $T_2$ is set to the remaining PDB. $T_{2min}$ is a minimum length for the resource selection window with respect to the priority of the SL TB. The UE selects $T_1$ subject to $0 \leq T_1 \leq T_{processing}$, where $T_{processing}$ is an amount of UE processing time allowed to perform UE autonomous resource allocation in mode 2 and encode PSCCH/PSSCH for transmission.

In some embodiments, monitoring slots belong to the sidelink resource pool according to the determined RSW and/or number of candidate slots (Y). In some examples, the monitoring slots belong to the sidelink resource pool is restricted to a subset of slots within a configured sensing window. In an example, when a set of one or more possible reservation periods allowed in the sidelink resource pool is provided by the UE higher layer, the slots in which the UE monitors are also determined according to the provided set of one or more resource reservation intervals. In some examples, the UE skips monitoring slots in which its own transmission occurs within the sensing window. In some examples, the UE skips monitoring slots (within the sensing window) that correspond to slots in which its own transmission occurs within the RSW (e.g., due to already planned sidelink and/or uplink transmissions).

In some embodiments, reporting to the higher layer of the UE, a set of candidate single-slot resources after exclusion of resources. In some examples, a candidate single-slot resource should be excluded from an initialized set of candidate single-slot resources when one of the following conditions is met. In some examples, the candidate single-slot resource overlaps with a resource indicated in a received SCI format 1-A and a measured RSRP of the SL transmission corresponding to the received SCI is higher than a corresponding RSRP threshold. In some examples, any candidate single-slot resource that correspond to slots that were not monitored by the UE as required by partial sensing. In some examples, for at least one periodicity value from the set of one or more possible reservation period allowed in the sidelink resource pool.

In summary, in some embodiments, the physical layer of the UE receiving a request/configuration to report a subset of resources of a sidelink resource pool as part of partial sensing-based UE autonomous resource allocation (i.e., in sidelink mode 2) for PSCCH/PSSCH transmission. The UE determines a resource selection window (RSW) and/or a number of candidate slots (Y) according to a time bound. The UE monitors slots belong to the sidelink resource pool according to the determined RSW and/or number of candidate slots (Y). Further, the UE reports to the higher layer of the UE, a set of candidate single-slot resources within the RSW after exclusion of resources.

Commercial interests for some embodiments are as follows. 1. Solving issues in the prior art. 2. Reducing/limiting power consumption. 3. Providing good communication performance. 4. Providing high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, smart watches, wireless earbuds, wireless headphones, communication devices, remote control vehicles, and robots for public safety use, AR/VR device maker for example gaming, conference/seminar, education purposes, smart home appliances including TV, stereo, speakers, lights, door bells, locks, cameras, conferencing headsets, and etc., smart factory and warehouse equipment including IIoT devices, robots, robotic arms, and simply just between production machines. In some embodiments, commercial interest for the disclosed invention and business importance includes lowering power consumption for wireless communication means longer operating time for the device and/or better user experience and product satisfaction from longer operating time between battery charging. Some embodiments of the present disclosure are a combination of "techniques/processes" that can be adopted in 3GPP specification to create an end product. Some embodiments of the present disclosure relate to mobile cellular communication technology in 3GPP NR Release 17 and beyond for providing direct device-to-device (D2D) wireless communication services.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware.

Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A resource monitoring method in sidelink communication by a user equipment (UE), comprising:

receiving, by a physical layer of the UE, a request and/or a configuration from a higher layer of the UE, to determine a subset of resources of a sidelink resource pool as part of partial sensing based on a mode 2 resource allocation for sidelink transmission;

determining a resource selection window and/or selecting a number of candidate slots in the sidelink resource pool according to a time bound;

monitoring slots according to the number of candidate slots and a set of one or more reservation periods provided by the higher layer; and reporting, to the higher layer, a set of candidate single-slot resources after exclusion of resources;

wherein when the mode 2 resource allocation is triggered in a slot n to determine the subset of resources for the sidelink transmission, one or more of following parameters are provided by the higher layer, and the one or more of following parameters comprises a maximum, minimum, or restricted number of candidate slots; a first layer (L1) priority for a corresponding sidelink data transport block (TB) to be transmitted; a remaining packet delay budget (PDB); a sidelink resource pool identifier and/or index; a set of one or more possible reservation period allowed for the sidelink resource pool; or a sidelink discontinuous reception (DRX) active/inactive period and/or timer;

wherein the time bound is provided as $T_{2max}$ or $T_{2min}$ for the resource selection window, or the maximum, minimum, or restricted number of candidate slots from the higher layer, where $T_{2max}$ is a maximum length for the resource selection window with respect to a priority of a sidelink TB, and $T_{2min}$ is a minimum length for the resource selection window with respect to the priority of the sidelink TB; and wherein $T_{2max}$, or $T_{2min}$ for the resource selection window, or the maximum, minimum, or restricted number of candidate slots is set based on a transmission priority of the TB ($Prio_{Tx}$) which has a total of 8 priority levels in L1, and each priority level has a corresponding value for $T_{2max}$, or $T_{2min}$ for the resource selection window, or the maximum, minimum, or restricted number of candidate slots.

2. The method of claim 1, wherein the one or more of following parameters are radio resource control (RRC) configured by a base station or pre-configured.

3. The method of claim 1, wherein the resource selection window is defined as a time interval.

4. The method of claim 1, wherein the number of candidate slots is greater than or equal to the minimum or restricted number of candidate slots.

5. The method of claim 1, wherein the candidate slots are selected based on the sidelink DRX active/inactive period and/or timer.

6. The method of claim 3, wherein the time interval is between $n+T_1$ and $n+T_2$ in the sidelink resource pool, the UE selects $T_2$ subject to $T_{2min} \leq T_2 \leq$ the remaining PDB, if $T_{2min}$ is smaller than the remaining PDB; otherwise $T_2$ is set to the remaining PDB.

7. The method of claim 1, wherein monitoring slots in the sidelink resource pool is restricted to a subset of slots within a configured sensing window.

8. A user equipment (UE), comprising:

a memory;

a transceiver; and a processor coupled to the memory and the transceiver;

wherein the processor is configured to receive, by a physical layer of the UE, a request and/or a configuration from a higher layer of the UE, to determine a subset of resources of a sidelink resource pool as part of partial sensing based on a mode 2 resource allocation for sidelink transmission;

wherein the processor is configured to determine a resource selection window and/or select a number of candidate slots in the sidelink resource pool according to a time bound;

wherein the processor is configured to monitor slots according to the number of candidate slots and a set of one or more reservation periods provided by the higher layer; and wherein the processor is configured to report, to the higher layer, a set of candidate single-slot resources after exclusion of resources;

wherein when the mode 2 resource allocation is triggered in a slot n to determine the subset of resources for the sidelink transmission, one or more of following parameters are provided by the higher layer, and the one or more of following parameters comprises a maximum, minimum, or restricted number of candidate slots; a first layer (L1) priority for a corresponding sidelink data transport block (TB) to be transmitted; a remaining packet delay budget (PDB); a sidelink resource pool identifier and/or index; a set of one or more possible reservation period allowed for the sidelink resource pool; or a sidelink discontinuous reception (DRX) active/inactive period and/or timer;

wherein the time bound is provided as $T_{2max}$, or $T_{2min}$ for the resource selection window, or the maximum, minimum, or restricted number of candidate slots from the higher layer, where $T_{2max}$ is a maximum length for the resource selection window with respect to a priority of a sidelink TB, and $T_{2min}$ is a minimum length for the resource selection window with respect to the priority of the sidelink TB; and wherein $T_{2max}$, or $T_{2min}$ for the resource selection window, or the maximum, minimum, or restricted number of candidate slots is set based on a transmission priority of the TB ($Prio_{Tx}$) which has a total of 8 priority levels in L1, and each priority level has a corresponding value for $T_{2max}$, or $T_{2min}$ for the resource selection window, or the maximum, minimum, or restricted number of candidate slots.

9. The UE of claim 8, wherein the number of candidate slots is greater than or equal to the minimum or restricted number of candidate slots.

10. The UE of claim 8, wherein the candidate slots are selected based on the sidelink DRX active/inactive period and/or timer.

11. The UE of claim 8, wherein:

the resource selection window is defined as a time interval; and the time interval is between $n+T_1$ and $n+T_2$ in the sidelink resource pool, the UE selects $T_1$ subject to $0 \leq T_1 \leq T_{processing}$, where $T_{processing}$ is an amount of UE processing time allowed to perform the mode 2 resource allocation and encode a physical sidelink control channel (PSCCH) and/or physical sidelink shared channel transmission (PSSCH) for transmission.

12. The UE of claim 8, wherein monitoring slots in the sidelink resource pool is restricted to a subset of slots within a configured sensing window.

13. The UE of claim 8, wherein a candidate single-slot resource is excluded from an initialized set of candidate single-slot resources when the candidate single-slot resource overlaps with a resource indicated in a received sidelink control information (SCI) format 1-A and a measured reference signal received power (RSRP) of the sidelink transmission corresponding to the received SCI format 1-A is higher than a corresponding RSRP threshold.

14. A non-transitory machine-readable storage medium having stored thereon instructions that, when executed by a computer, cause the computer to perform a resource monitoring method in sidelink communication by a user equipment (UE), comprising:

receiving, by a physical layer of the UE, a request and/or a configuration from a higher layer of the UE, to determine a subset of resources of a sidelink resource pool as part of partial sensing based on a mode 2 resource allocation for sidelink transmission;

determining a resource selection window and/or selecting a number of candidate slots in the sidelink resource pool according to a time bound;

monitoring slots according to the number of candidate slots and a set of one or more reservation periods provided by the higher layer; and reporting, to the higher layer, a set of candidate single-slot resources after exclusion of resources;

wherein when the mode 2 resource allocation is triggered in a slot n to determine the subset of resources for the sidelink transmission, one or more of following parameters are provided by the higher layer, and the one or more of following parameters comprises a maximum, minimum, or restricted number of candidate slots; a first layer (L1) priority for a corresponding sidelink
data transport block (TB) to be transmitted; a remaining
packet delay budget (PDB); a sidelink resource pool
identifier and/or index; a set of one or more possible
reservation period allowed for the sidelink resource
pool; or a sidelink discontinuous reception (DRX)
active/inactive period and/or timer;

wherein the time bound is provided as $T_{2max}$, or $T_{2min}$ for
the resource selection window, or the maximum, mini-
mum, or restricted number of candidate slots from the
higher layer, where $T_{2max}$ is a maximum length for the
resource selection window with respect to a priority of
a sidelink TB, and $T_{2min}$ is a minimum length for the
resource selection window with respect to the priority
of the sidelink TB; and wherein $T_{2max}$, or $T_{2min}$ for the resource selection win-
dow, or the maximum, minimum, or restricted number
of candidate slots is set based on a transmission priority
of the TB ($Prio_{Tx}$) which has a total of 8 priority levels
in L1, and each priority level has a corresponding value
for $T_{2max}$, or $T_{2min}$ for the resource selection window, or
the maximum, minimum, or restricted number of can-
didate slots.

* * * * *